United States Patent [19]
Vega

[11] Patent Number: 5,221,052
[45] Date of Patent: Jun. 22, 1993

[54] HOUSEHOLD SEPARATING COMPACTOR

[76] Inventor: Jose A. Vega, 109 Petrossi Dr., Rochester, N.Y. 14621

[21] Appl. No.: 950,280

[22] Filed: Sep. 24, 1992

[51] Int. Cl.5 ............................................ B02C 19/14
[52] U.S. Cl. .................................... 241/36; 241/37.5; 241/88.4; 241/89; 241/95; 241/99; 241/100; 241/287; 100/902
[58] Field of Search ............... 241/99, 100, 285.3, 241/287, 79, 36, 37.5, 89, 95, 88.4; 100/902

[56] References Cited

U.S. PATENT DOCUMENTS

| | | | |
|---|---|---|---|
| 2,176,552 | 10/1939 | Vocaturo | 241/99 |
| 3,687,062 | 8/1972 | Frank | 100/91 |
| 3,741,108 | 6/1973 | Stratman et al. | 100/229 A |
| 4,073,228 | 2/1978 | Henzl | 100/52 |
| 4,084,755 | 4/1978 | Shimottzaka et al. | 241/95 |
| 4,121,514 | 10/1978 | Nickaloff | 100/91 |
| 4,373,435 | 2/1983 | Grevich | 100/49 |
| 4,570,536 | 2/1986 | Dodd | 100/53 |
| 4,729,303 | 3/1988 | Durbin | 100/214 |
| 4,817,521 | 4/1989 | Katada et al. | 100/240 |
| 5,139,205 | 8/1992 | Gallagher et al. | 241/33 |
| 5,165,334 | 11/1992 | Aluotto et al. | 100/112 |
| 5,167,184 | 12/1992 | Rebecchi | 100/92 |

Primary Examiner—Mark Rosenbaum
Assistant Examiner—John M. Husar
Attorney, Agent, or Firm—Richard C. Litman

[57] ABSTRACT

A household compactor and separator utilizes linear motion in crushing glass and metal refuse for comminution and separation. A crushing element disposed on a worm shaft crushes refuse against a steel grate, broken glass falling therethrough into a glass receptacle. Crushed metal cans fall into a metal receptacle when the grate is released to swing downwardly. The grate is restored to its original position by pulling control lines via a handle, and the grate is secured by solenoid operated latches. The worm shaft is driven by an electric motor operating through a gear box. The compactor is housed in an enclosure having upper and lower doors and pushbutton controls located in the front. Refuse is inserted through the upper door into a compaction chamber. The glass and metal receptacles are removed through the lower door for emptying. Safety switches sense door, grate, and crushing element positions, inhibiting operation if an unsafe condition is sensed.

6 Claims, 2 Drawing Sheets

HOUSEHOLD SEPARATING COMPACTOR

BACKGROUND OF THE INVENTION

1. Field of the Invention

The present invention relates to compactors, and more particularly compactors having ability to separate glass from metal.

2. Description of the Prior Art

Refuse compactors having separating capabilities are well known, as evidenced by U.S. Pat. Nos. 3,687,062, issued to William J. Frank on Aug. 29, 1972; 3,741,108, issued to Jerome F. Stratman et al. on Jun. 26, 1973; 4,073,228, issued to Jerry Henzl on Feb. 14, 1978; 4,121,514, issued to Raymond M. Nickaloff on Oct. 24, 1978; 4,373,435, issued to John J. Grevich on Feb. 15, 1983; 4,570,536, issued to Robert N. Dodd on Feb. 18, 1986; 4,729,303, issued to James L. Durbin on Mar. 8, 1988; and 4,817,521, issued to Katsuo Katada et al. on Apr. 4, 1989. Most of these devices are intended for commercial use, either by a refuse processor, or by a business which by its nature generates such waste, which waste must be temporarily stored on the premises. In either case, space is a valuable resource to be conserved to the greatest feasible extent.

The same need arises in residential units, where space is, in most cases, at a greater premium than in commercial establishments. It is therefore desirable to provide a compact unit which combines compaction with separation of crushed materials.

This purpose is addressed by the patent to Frank, which patent incorporates a vibrating grid, magnetic separation, and a conveyor. Frank also discloses separation of cans from crushed glass by provision of a screen, through which glass particles fall, while the crushed cans proceed on to a magnetic conveyor. However, the attendant bulk, cost, and mechanical complexity might render the device unsuitable for ordinary household use.

Most prior art units employ a linearly moving ram to achieve compaction. By contrast, a compound motion crushing element is seen in the patent to Grevich, which further discloses separation of steel cans, aluminum cans, and glass. A toothed mobile jaw following an oval path approaches a corresponding toothed stationary jaw, crushing cans or the like trapped therebetween. Again, the complexity of the Grevich invention likely makes it unsuitable for household use.

The other prior art patents noted above are related to the instant invention as follows. These inventions teach various compactor drives and safety switches but do not disclose the uncomplicated helical compactor drive of the instant invention, combined with equally uncomplicated crushed glass and cans separation assembly.

The Dodd and Stratman et al. patents each disclose a threaded drive rod having a lower compacting plate. In Stratman et al., a pair of parallel guide rods are also provided to control movement of the compactor plate.

The Durbin and Katada et al. patents shown examples of trash compactors utilizing hydraulic rams to drive compactor plates. In Henzl, the compactor plate is driven by four hydraulic rams. Henzl further discloses a cabinet enclosure with panel mounted control buttons for operating switches, and a safety switch disabling the compactor motor when the loading door of the compactor is open. The Nickaloff invention includes both an initial can shredder followed by a hydraulically driven compactor plate for completing the trash compacting process.

None of the above inventions and patents, taken either singly or in combination, is seen to describe the instant invention as claimed.

SUMMARY OF THE INVENTION

The present invention provides a compactor utilizing a crushing element which moves helically, and crushes bottles and cans between the element and a strong steel grate. Broken glass is free to fall through the grate into a first receptacle. The grate is released, on demand, to swing downwardly, thus causing crushed cans to fall into a second receptacle. A guide plate prevents glass from falling into the second receptacle.

The compactor is enclosed within a housing having upper and lower doors. The upper door leads to a compaction chamber. The lower door allows the crushed material receptacles to be slid out for emptying. Switches sense door, grate, and crushing element position, and inhibit operation if an unsafe or inoperative condition exists.

Advantages accruing from the helical motion of the crushing element include increased ability to push crushed particles through the grate; increased ability to dislodge crushed cans from the grate; and increased ability to flatten metal cans and the like. Flattening is enabled by the propensity of the crushing element to topple or push over vertically oriented sections of sheet metal wall which would otherwise tend to resist linear compaction.

Accordingly, it is a principal object of the invention to provide a combination crushing and separating refuse compactor.

An additional important object of the invention is to provide a refuse compactor having helical crushing action.

It is another object of the invention to provide a compact, self-contained and enclosed refuse compactor.

It is a further object of the invention to optimize volume devoted to reduction and storage of a refuse compactor.

Still another object of the invention is to provide a refuse compactor capable of separating metal from glass refuse.

Yet another object of the invention is to provide a refuse compactor operable on household electrical power.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
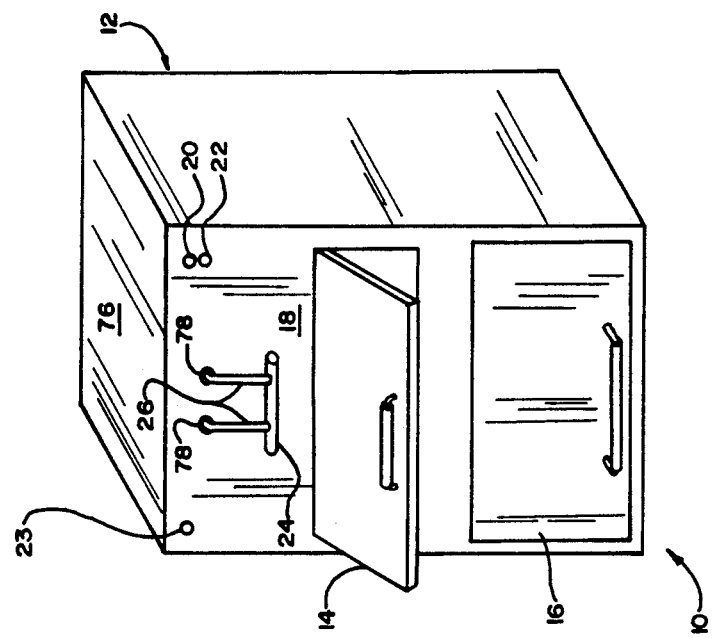
FIG. 1 is a front perspective view of the invention.

The present invention comprises a refuse compactor 10, seen in FIG. 1, for household use. The compactor 10 is housed in a rectangular housing 12, the front side of which has upper and lower doors 14,16 and a fixed panel 18. "On" and "Off" pushbutton controls 20,22 and a "Dump" pushbutton control 23 are mounted in fixed panel 18. Also, a handle 24 and associated protruding control lines or ropes 26 are disposed on the front surface of fixed panel 18.

Figure 2:
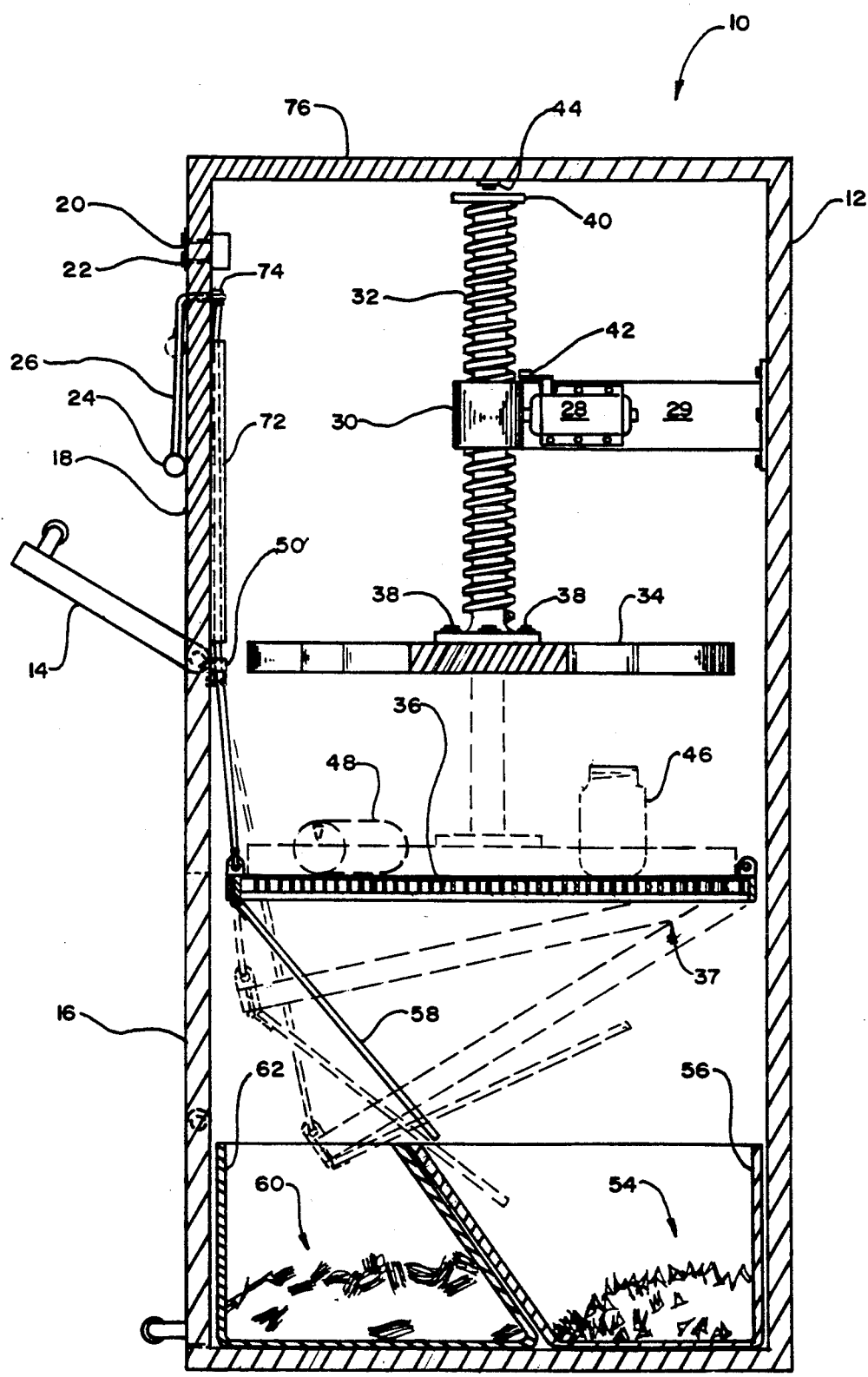
FIG. 2 is a side cross sectional view of the invention.

Turning now to FIG. 2, a motor 28, gearbox 30, worm shaft 32, movable crushing element 34, and stationary crushing surface 36 are shown. It is to be understood that the motor 28 and gearbox 30 are solidly fixed to the housing 12, as by a suitable bracket 29. The crushing surface 36 is also solidly supported in a manner to be discussed hereinafter.

Upon the "On" control 20 being activated, motor 28 is energized, and moves the worm shaft 32 and crushing element 34 downwardly, when starting from the position illustrated in FIG. 2. The worm shaft 32 and crushing element 34, the latter 34 preferably being a circular metal plate secured to worm shaft 32, as by bolts 38, move downwardly and rotate simultaneously. Crushing element 34 thus moves linearly, progressing until a plate 40 contacts a lower position, reversing switch 42. The motor 28 then reverses direction. The crushing element 34 and worm shaft 32 return to an upper position (as illustrated in FIG. 2), whereupon contact of the plate 40 with an upper position, reversing switch 44 again reverses the motor 28. Operation is stopped by pressing the "Off" pushbutton 22.

Circuitry to accomplish operation as described is well known. Therefore, circuitry, wiring, and details such as switch internal construction will be omitted from this discussion.

Material to be crushed and separated, preferably glass jars and bottles 46, and metal cans 48 (as seen in FIG. 2), are placed on the crushing surface 36, access being provided by upper door 14. A safety switch 50 senses door position, and disables motor 28 unless the door 14 is closed.

Figure 3:
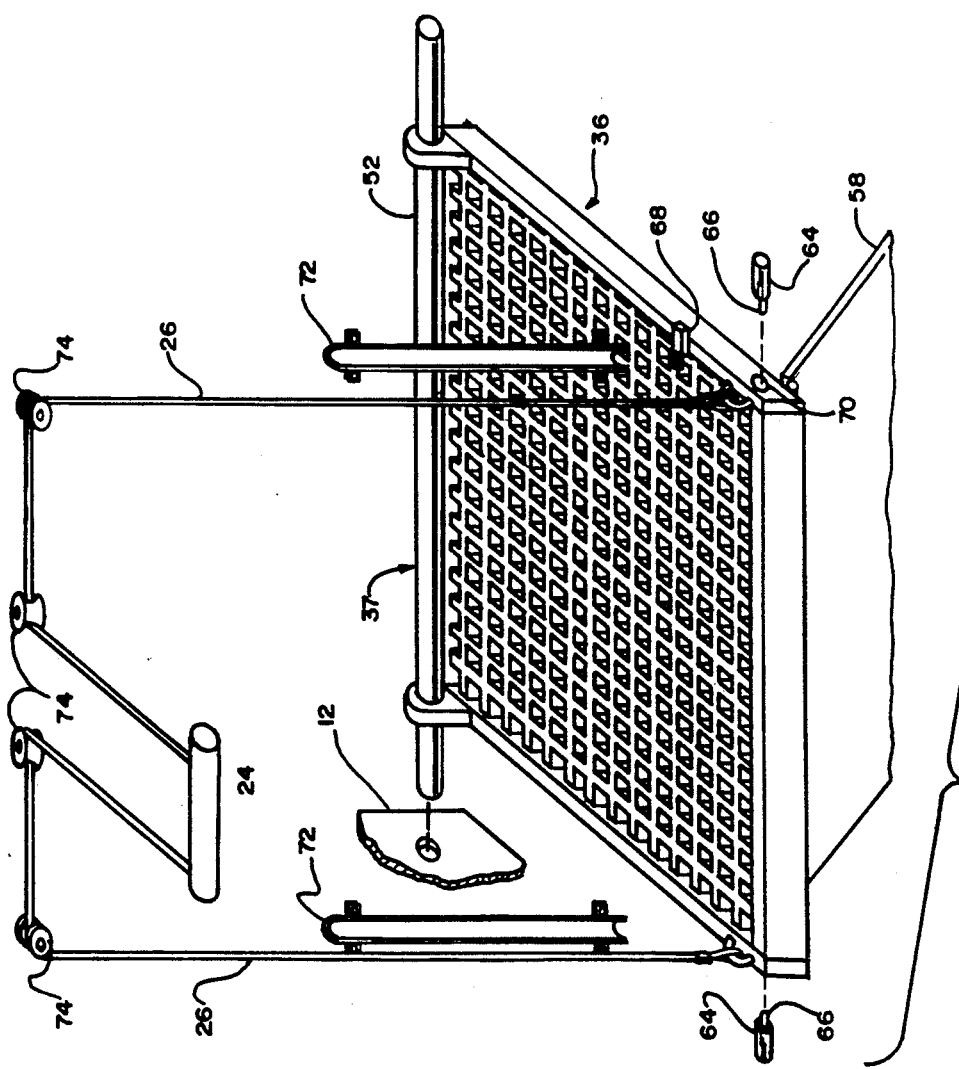
FIG. 3 is an exploded detail view of the grate and associated components shown isolated from the rest of the compactor.

Crushing surface 36 and associated control components are shown isolated from the housing 12 in FIG. 3. Crushing surface 36 comprises a strong metal grate 37, and is pivotally attached to housing 12, as by a bar 52 anchored to housing 12. Glass waste 54 is comminuted into particles sufficiently small to fall through the grate 37 into a glass receptacle 56 below. A plate 58 is affixed to crushing surface 36 to guide glass particles 54 into glass receptacle 56, thus segregating glass 54 from metal (best seen in FIG. 2). Metal refuse 48, in the form of substantially flattened cans 60, is dumped into a metal receptacle 62. Lower door 16 provides access to receptacles 56, 62, enabling period emptying and replacement thereof.

Crushing surface 36, normally maintained in a horizontal position by solenoids 64, is released to pivot downwardly when "Dump" pushbutton 23 (FIG. 1) is actuated. Solenoid fingers 66 retract, allowing crushing surface 36 to pivot downwardly, by force of gravity, to limits dictated by both the length of control lines 26, 26, and the consequent pulling action on handle 24, to a stop position against panel 18. This is shown by phantom lines in FIG. 2. Flattened metal refuse 60 then falls into metal receptacle 62. Crushing surface 36 is restored to its horizontal position by pulling handle 24. Once horizontal, crushing surface 36 trips a limit switch 68, which in turn operates solenoids 64 to extend their respective fingers 66 into engagement with holes 70 in crushing surface 36. Crushing surface 36 is once more supported in its horizontal position.

Control lines 26,26 are retained against the front of housing 12 by guides 72,72 so that lines 26,26 do not interfere with crushing element 34. Pulleys 74 direct control lines 26,26 to handle 24 through bores 78,78 in front panel 18, as clearly seen in FIG. 1.

The novel compactor 10 may be run on nominal 120 volt, AC current, commonly available in residences. Electric current is connected as by a common male plug type electric cord (not shown). The compactor 10 is preferably built to standard counter height, and is rectangular, thereby being readily incorporated into a kitchen, utility room, or basement of a residence (not shown). The flat top surface 76 is usable as a counter or workbench. The compactor 10 may thus be incorporated into most residences as a permanent or portable household appliance.

It is to be understood that the present invention is not limited to the sole embodiment described above, but encompasses any and all embodiments within the scope of the following claims.

I claim:

1. A refuse compactor comprising:
   a housing having an upper portion, a middle portion, and a lower portion thereof;
   a movable crushing element having an initial elevated position located between said upper portion and said middle portion of said housing;
   a compaction chamber located in said middle portion of said housing;
   a metal grate located between said middle portion and said lower portion of said housing, said metal grate including a crushing upper surface, a bottom surface, and a plurality of sides;
   a pivotal connection with said housing located on a first side of said plurality of sides of said metal grate;
   retractable support means connected to said housing for engaging said metal grate when extended so as to maintain said metal grate in an initial horizontal position and for enabling said metal grate to pivot along said pivotal connection when said retractable support means is retracted so as to enable said metal grate to drop from said initial horizontal position to a slanted position; and
   reversible drive means connected to said housing including means for linearly moving said crushing element from said elevated position a predetermined distance in a downward direction towards said metal grate to a farthest lowered position, and for linearly moving said crushing element from said lowered position to said elevated position;
   wherein said crushing upper surface of said metal grate includes apertures located thereon so as to enable fragmented particles of a predetermined size or less to pass from said upper surface of said metal grate to said bottom surface thereof.

2. A refuse compactor as claimed in claim 1, further comprising:
   a first receptacle located in said lower portion of said housing; and
   a second receptacle located in said lower portion of said housing adjacent said first receptacle;

whereby any frangible material comminuted into said fragmented particles by said crushing element passes through said apertures to said first receptacle and any material not frangible crushed by said crushing element passes to said second receptacle when said retractable support means is retracted enabling said metal grate to drop from said initial horizontal position to said slanted position.

3. A refuse compactor as claimed in claim 2, further comprising a plate pivotally attached to said bottom surface of said metal grate for preventing any of said fragmented particles from dropping into said second receptacle.

4. A refuse compactor as claimed in claim 3, further comprising a door for enabling access to said middle portion when open and a safety switch located in proximity to said door for disabling said reversible drive means when said door is open.

5. A refuse compactor as claimed in claim 4, further comprising means for removing said first and second receptacles from said lower portion of said housing.

6. A refuse compactor as claimed in claim 5, wherein said reversible drive means further comprises means for rotating said crushing element, thereby increasing the ability of said crushing element to push crushed particles through said metal grate, to dislodge crushed cans from said metal grate, and to flatten metal cans.

* * * * *